Jan. 12, 1960        R. M. GRANDY        2,920,968
FROZEN FOOD PACKAGE
Filed June 14, 1956
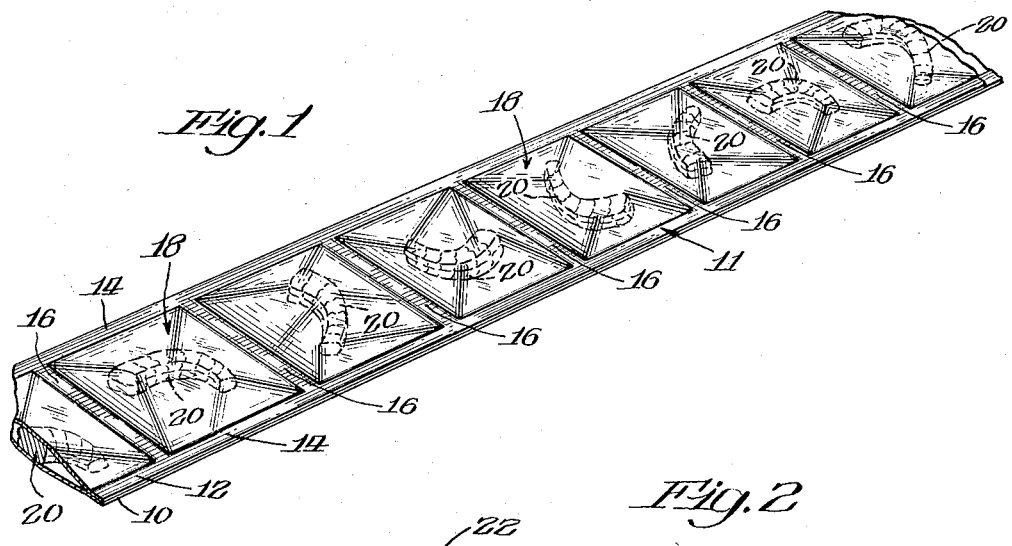
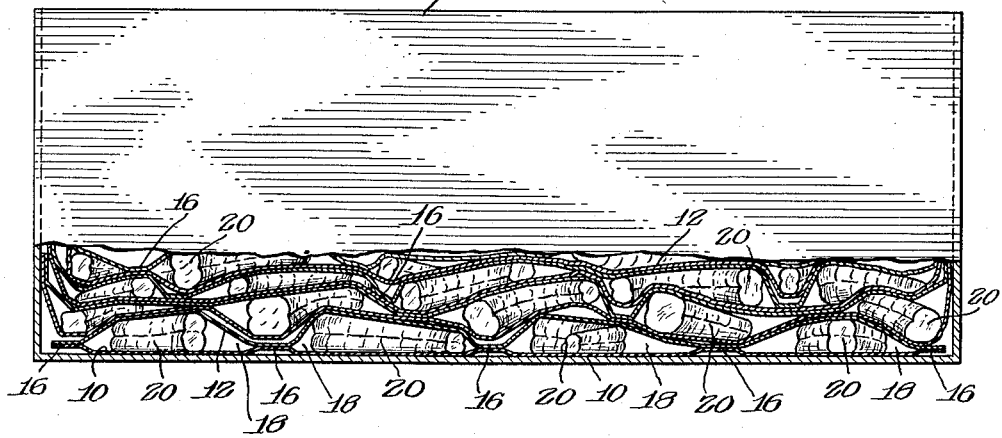
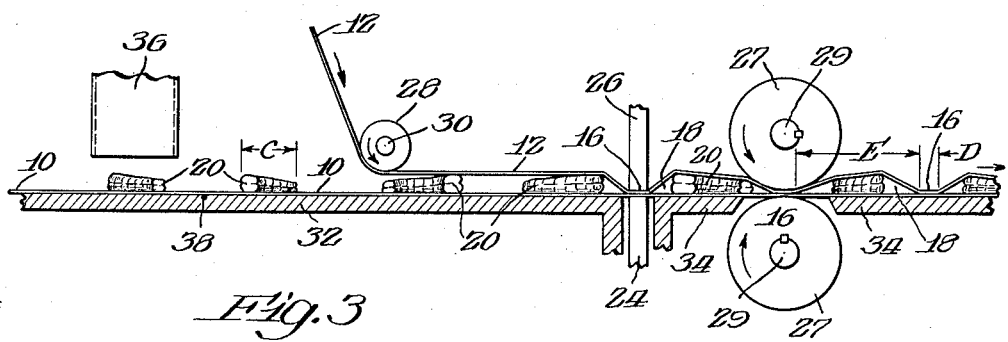
Inventor:
Robert M. Grandy
By Soans, Anderson, Luedeka & Fitch
Attys.

United States Patent Office 2,920,968
Patented Jan. 12, 1960

2,920,968

FROZEN FOOD PACKAGE

Robert M. Grandy, Harlingen, Tex., assignor to Alberti Seafoods Company, a partnership Application June 14, 1956, Serial No. 591,487

2 Claims. (Cl. 99—195)

This invention relates to improvements in packages and packaging methods, and more particularly to a process for packaging irregularly shaped articles of sea food and to a package of sea food suitable for freezing and for removal of individual sea food articles therefrom.

The packaging of sea foods has presented a difficult problem to the food packaging industry. The term sea foods is intended to include fresh water fish as well as salt water fish and to specifically include such sea food articles as raw or cooked shrimp tails, lobster tails, scallops, whole fish, fish with heads removed, fillets, fish steaks, etc. These sea food articles are of non-uniform size and shape and this non-uniformity, especially the non-uniformity of shape, makes the packaging of the sea food articles very difficult. Further, sea foods are extremely susceptible to decay and will spoil when exposed to air at elevated temperatures for extended periods of time.

The usual method of packaging the sea food articles has been to place several pieces of the sea food into a water and air-impervious container followed by sealing of the container and quick freezing of the container with its sea food contents. This method of packaging is unsatisfactory to the user of the sea foods since the sea food articles contain moisture which causes the sea food articles to freeze together thereby forming a solid frozen mass and, therefore, the package represents an unadjustable unit. Whether the contents be 8 ounces, or 10 ounces, or 1 pound, or 5 pounds, etc., the user is required to use the entire content or else saw or chop away at the frozen mass in order to obtain the desired number of sea food articles. The user could also thaw the frozen package, select the number of sea food articles desired and refreeze the remainder. The thawing and refreezing is extremely unsatisfactory however, since this procedure is time consuming and further the desirable quality of firmness tends to be destroyed. Whether the contents be thawed, or the desired number of sea food articles obtained by cracking or sawing methods, the remaining sea food articles, which will be kept frozen, are exposed to air which is at an elevated temperature. This exposure to warm air tends to discolor or darken the exterior of the sea food articles which renders them less pleasing to the eye. The discolored portions are also generally less palatable.

The present invention provides a process of packaging sea food articles which eliminates many of the undesirable features of the prior methods. The invention also includes a uniquely designed package of sea food.

It is an object of the present invention to provide a new process for packaging irregularly shaped sea food articles. It is another object of the present invention to provied a novel and unique package of sea food which enables the user of the sea food to select the exact number of sea food articles desired and still not necessarily expose the remaining sea food articles to thawing conditions.

Further objects and advantages of the present invention will be apparent from the following description and accompanying drawings which illustrate one form of the invention.

In the drawings:

Figure 1 is a perspective view of one form of package strip made in accordance with the present invention showing shrimp tails 20 sealed in individual compartments, Figure 2 is a cross section of a package of shrimp tails containing several layers of the package strips of shrimp tails shown in Figure 1, Figure 3 is a diagrammatic illustration, partly in cross section, of apparatus providing for a simple continuous method of preparing package strips as shown in Figure 1.

The present invention provides for a method of packaging irregularly shaped individual sea food articles in individual enclosures which allows said articles to be frozen and which permits individual sea food articles to be removed for use without thawing the sea food articles. The individual sea food articles are placed in spaced-apart relationship between flexible sheet material and sealing means applied to seal said material together in a manner effecting sealing of the said sea food articles in individual enclosures.

The invention also provides a package of irregularly shaped sea food articles suitable for freezing and for removal of individual sea food articles therefrom. The package comprises at least two layers of package strips containing sea food articles, the articles within each layer being spaced apart from each other. The articles are secured between two sheets of flexible sealable sheet material and the sheet materials are sealed in a manner to provide separate enclosures for each of the sea food articles. The enclosures are of a size substantially greater than each of the individual articles to permit shifting of said articles within said enclosures. The package strips, which comprise sea food articles sealed in individual compartments in sealable material, are placed within a suitable container. The package strips may be cut into suitable lengths, each length containing at least one of the sea food articles and preferably at least two sea food articles. These lengths of the package strips may be placed in the container in layers one on top of the other, or one next to the other, in a manner so that the articles in one layer closely nest with respect to articles within adjacent layers. In this manner a compact package is formed with substantially no voids between adjacent sea food articles. Instead of cutting the package strip into lengths and placing the lengths in layers in the container, the package strip may be folded over itself until the desired number of layers is obtained.

As hereinbefore mentioned, the prior methods of packaging sea foods were unsatisfactory, since the package represented an unadjustable unit. For example, a housewife desiring six shrimp for a cocktail would be required to open a container holding two dozen shrimp and chop away at the frozen mass to free the six shrimp or she would have to thaw the contents, select the six shrimp and refreeze the others. The present invention provides for each shrimp in an individual enclosure whereby the housewife may easily open the number of enclosures necessary and the remainder is not exposed to thawing conditions. The individual enclosures of sea food articles are easily opened when prepared according to the process of this invention. The process also enables several of the shrimp, in their individual enclosures, to be placed inside of a suitable container in a manner providing for economical use of the space in the container.

The two sheets of material are sealable one to the other. It is not necessary that each of the sheets be sealable with respect to other generally sealable materials or even to the same type of material. However, they must be sealable with respect to each other. For example, sheet material A may be sealable to sheet material B or the material of each sheet may be the same material.

It is preferred that the sealable material be very flexible or pliable, that is capable of being easily conformed to the slope of the irregularly shaped sea food article as well as bent and adapted to the shape of the surrounding or supporting structures. This characteristic is desired so that when the sea food articles in the enclosures are placed in a container the enclosures will modify their shapes in relationship to the container and to each other so that the container may be filled to a greater extent with the sea food articles, and voids in the container substantially eliminated. It is also preferred that the flexible sheet material be transparent so that the ultimate user, which is usually the housewife, may visually inspect the sea food articles in their enclosures.

Various types of suitable flexible sheet material, plastic film, foils, etc., can be used in the process. Examples are Cellophane coated with a wax-like material such as the material sold under the trade name "Parakote," rubber hydrochloride such as the material sold under the trade name "Pliofilm," vinyl chloride acetate sheets such as the material sold under the trade name "Vinylite," vinylidene-vinyl chloride sheets such as the material sold under the trade name "Saran," and various other sealable, flexible sheets as well as various laminated sheets embodying the foregoing or other material.

The sea food articles are sealed in a manner to enclose the articles in individual enclosures. The seal between the two sealable sheet materials need not be a hermetic seal but may be a crimp seal, adhesive seal, heat seal, etc. of a type providing for passage of air therethrough. A suitable seal of this type is the skip-seal, in which the sheets are not sealed continuously but only at intervals which allow for the passage of air through the spaces between the seals. The seals however may be of the continuous type and a hermetic seal may also be provided. With the use of air impervious sheet material and a hermetic seal, the air may be removed from the compartments by suitable vacuum means. To allow air escape from the compartments, a perforated air impervious sheet material may be used.

The sea food articles may then be sealed in any suitable manner such as by crimping, adhesive seals, heat seals, etc., and the seals may be of an air tight nature or otherwise. The operation may be performed by pressing the sheets together along a narrow band to form the seal. In heat sealing operations the band is heated. This may be done by pressing the sheets together with heated rods or bars thereby sealing the sheets together along the length of the rod or bar, however, the seal need not be a continuous seal but may be a skip-seal which leaves unsealed spaces between the sealed portions. The sealing may also be done by suitable rollers, which are heated in a heat sealing operation. The heat seal need not be a straight line seal but may be curved or otherwise shaped. The enclosure for the seafood article therefore need not be square or rectangular in shape but may be circular, elliptical or of any other convenient shape which may be preferred. The width of the seal may be any suitable width and the width of the seal is preferably less than the width of a sea food article. The heat sealing operation is preferably done at a temperature such that a low strength seal is effected between the sheet materials.

The seal is preferably a readily frangible seal which allows the user to easily tear the seal apart allowing easy access to the frozen sea food article. The seal may be of the type which permits the sheet materials to be peeled apart without difficulty and without tearing. One of the strips may overlap the other thus providing a finger grip and facilitating gripping with the fingers for opening the package by peeling the sheet materials apart. Therefore, even though an air tight seal may be provided, the package may nevertheless be opened easily and without special implements.

The size of the enclosure in which the individual sea food article is enclosed is an important feature of this invention. The enclosure should be large enough so that the sea food article has freedom of motion so that it may move about or slide about freely within the enclosure. It is important that the enclosure be larger than the sea food article since, as hereinbefore mentioned, the sea food articles are of irregular shape and, therefore, if the size of the enclosure were such that it would tightly enclose a sea food article of a specific shape, the articles of different shape could not be suitably packaged. Further, the width of the seal between adjacent sea food containing enclosures is narrower than the width of the article. The sea food articles are arranged in containers in a manner wherein layers of the package strips containing the sea food articles are placed in layers one on top of the other. A freedom of motion of the sea food article within the enclosure and a flexibility of the sheet material is desirable so that the sea food articles may nest and the space or voids between the sea food articles may be filled providing more economical use of the space within the container. This feature is hereinafter described in greater detail.

Referring now to Figure 1 of the drawing, which is a perspective view of a package strip of shrimp sealed in individual enclosures, a sheet of very pliable, transparent, sealable sheet material 10 is illustrated as being sealed to a sheet of pliable, transparent, sealable sheet material 12 and, as hereinbefore mentioned, the materials 10 and 12 may be of the same material or of different materials. The sheets, 10 and 12, are indicated as being sealed together along the border with longitudinal seals 14 and the transverse seals 16. The longitudinal seals 14 and the transverse seals 16 are illustrated as straight line seals; however, these seals may be curved or otherwise shaped as desired. The longitudinal seals 14 and transverse seals 16 are made so that the individual shrimp tails 20 are enclosed or enveloped in individual enclosures 18. The shrimp tails 20 are, therefore, individually packaged in compartments of the package strip.

It may readily be seen from the drawing that the enclosure 18 is larger than the shrimp tail 20. This allows the shrimp tail to be moved about in the enclosure. Transverse seals 16 are also narrower than the width of the articles 20. These are important features. Since the sealable sheet materials 10 and 12, are preferably very pliable, the shape of the compartment 18 may vary considerably. With the shrimp tail in the center, the compartment 18 is thicker at the center, sloping off to the sides; with the shrimp tail over to one edge, the enclosure is necessarily thicker along the edge. The enclosure, therefore, readily changes its shape to accommodate the shrimp tail.

When another package strip, such as the package strip illustrated in Figure 1, is placed on top of a package strip in a container, or generally when two such package strips are placed together, the shrimp tails will slide about in the enclosures 18 and the enclosures will adapt themselves in shape in a manner such that the shrimp tails in the two package strips will nest or accommodate each other to form a compact unit. The shrimp tails in one package strip will adjust themselves into and somewhat along the direction of the transverse seals 16 of the other package strip and will slide about and position themselves in their individual compartments to take a position next to or between the shrimp tails of the other package strip. The enclosures, in which the shrimp are, also change shape. These features may readily be seen in Figure 2 which is a cross section of a package of shrimp tails comprising a container 22 containing several layers of the package strips of shrimp tails enclosed in individual compartments 18 as is illustrated in Figure 1. The cross section is taken approximately through the center of the box containing the package strips of shrimp tails so that the package strips are cross-sectioned along a longitudinal line approximately down the center of the strip. The random positioning of the shrimp tails 20 within their individual compartments may easily be seen. The various shapes of the compartments 18 are also evident. The shrimp tails 20 in any upper layer are not directly on top of the shrimp tails 20 in the lower layer but tend to nest and fit between the shrimp tails 20 in the lower package strip. The shrimp tails 20 in the compartments in the two adjacent package strips which are being pressed together therefore shift about within the compartments and fill what otherwise would be voids between the two package strips. This shifting of the shrimp tails within the compartment and the adjusting of the shape of the compartments and the position of the shrimp tails within the compartments provides for nesting of the shrimp tails and a uniform package with a minimum of voids between the package strips, as can be seen in Figure 2. These features are an important aspect of this invention.

The process of the present invention may be simply practiced by suitably placing the shrimp tails between two sheets of flexible sealable material so that the shrimp are spaced apart by more than the width of the seal between the sea food articles. Closer spacing will seal the shrimp tails tightly within the compartments and it is a feature of this invention that the shrimp tail be movable about within the enclosure. A sealing means is then applied to seal the two sheets together in a manner providing for sealing of the shrimp tails within individual enclosures.

A simple apparatus suitable for practicing the method is diagrammatically illustrated in Figure 3. In the illustrated embodiment of the invention, the sealing rolls are heated since the sheet materials which are commonly used in the packaging are heat sealable. However, if an adhesive seal is to be employed, suitable sealing means for that type of material should be used.

A sheet of heat sealable material 10 is illustrated as being continuously drawn by a suitable drawing means (not illustrated) such as rollers from a wrapper supply means (not illustrated) along a flat table or supporting members 32 and 34 which are shown in cross section. The sheet passes beneath a shrimp dispensing apparatus 36 at which point a shrimp tail 20 is deposited upon the sheet 10. The sheet 10 is drawn along by suitable means (not illustrated) until the deposited shrimp clears the shrimp dispensing apparatus by at least the width of heat seal and then another shrimp tail is deposited on the sheet. The rate of placing of the shrimp tails is regulated so that the distance traveled by sheet 10 before the placing of the next shrimp tail is at least the distance traveled by said sheet 10 in clearing a shrimp tail past some arbitrary point, for example, point 38 on member 32 plus the width of a heat seal. The rate is preferably controlled so that the sheet travels between about one and one quarter times the maximum distance necessary to move the shrimp tail past the shrimp tail dispensing apparatus, plus the width of the heat seal. The effective length of the shrimp is shown in the drawing as dimension C which is the projected length of the shrimp measured along a line parallel to the direction of travel of the sheet 10. The width of the heat seal is indicated as dimension D. The width or length of an enclosure 18, indicated as dimension E, is greater than dimension C and preferably is at least one and one quarter times greater. The shrimp tails 20 may be longitudinally spaced apart in random alignment on the sheet 10 by the dispensing apparatus 36; however, the shrimp tails are very irregular in shape and have different curvatures and it is preferred that the shrimp tails be aligned so that they are in a generally transverse position on the sheet 10.

The upper sealing sheet 12 from wrapper supplying means (not illustrated) passes under idler roll 28 mounted on shaft 30, which are shown in cross section. The position of the idler roller 28 is such that the upper layer of heat sealable material 12 is placed just above the shrimp tails 20 or sheet 12 may be contacted with the shrimp tails 20. The sheets 10 and 12 with the shrimp between the two are then moved into the heat sealing zone. The transverse heat seal is illustrated as being formed by heated flat plates 24 and 26 which are shown in cross section. Lower plate 24 may be stationary with upper heated plate 26 moving up and down so as to seal the sheets 10 and 12 together between the heated plates 24 and 26, however, plates 24 and 26 may both be movable, or either may be movable.

After forming the transverse heat seal, the sheets or strips 10 and 12 continue to be drawn along the table 34 and the longitudinal heat seals are formed by passing the sheets between two pairs of heated rollers 27, one pair of rollers 27 on each side of the strips 10 and 12 being mounted on shafts 29. The shaft 29 is keyed or otherwise attached to the roller 27. The longitudinal heat seals are also far enough apart to allow the shrimp tails freedom of motion within the enclosures 18. The longitudinal heat seals are therefore apart by at least the projected length of the shrimp measured along a line perpendicular to the line of travel of sheet 10 and preferably are apart by at least one and one quarter times said projected length. The longitudinal seals may, of course, be made first and then the transverse seals, or they may be made simultaneously or the seals may not be separate seals but may be one continuous seal such as a circular or elliptical seal. The package strips containing individual shrimp in separated compartments may then be packaged in a box or container and the entire box frozen. The box or container which contains the package strips is usually wrapped in an air impervious sheet material which is preferably hermetically sealed.

It may be desirable to cut the package strip into suitable lengths before packaging, or the package strip may be folded over itself in layers until the desired number of sea food articles are packaged into the container. When two strips are pressed together in the container, the shrimp tails within the compartment will slide about and position themselves and the shape of the enclosure will change in a manner so that the two strips will closely nest. The void spaces between the package strips and between the sea food articles are, therefore, at a minimum. When packaging the package strips into a container, it may be desirable to vibrate or oscillate the package strips to aid the shrimp tails in moving about in their respective compartments. This oscillatory motion will tend to aid the nesting of the sea food articles together.

After packaging the package strip or package strips of shrimp tails in a suitable box or container, the container is suitably sealed and frozen. When the user of the shrimp tails opens the package, he may easily cut or tear off the number of shrimp tails desired and the remainder may be kept frozen. The shrimp tails are easily removed from the individual enclosures by tearing or cutting of the flexible sheet materials without the use of special implements. In many instances with a frangible type seal the sheets may be peeled apart, and in this manner the two sheets, for example sheets 10 and 12 in the drawings, may be pulled apart and the shrimp tails thus released.

While the description of the process and the package has been specifically directed to shrimp tails, it is understood that other irregularly shaped sea food articles may be packaged in this manner.

From the foregoing, it may be seen that there has been described a new and useful method of packaging sea foods. Various features of the invention which are believed to be new are set forth in the appended claims.

I claim:

1. A frozen seafood pack comprising a generally rigid outer container having therein at least two package strip layers in superposition, each of said package strip layers containing a plurality of seafood articles of irregular size and shape which are individually sealed in spaced-apart relation along the strip, said package strip layers each comprising flexible, sealable sheet material forming an interconnected series of enclosures along the strip, said enclosures each containing one of said articles, and said enclosures being spaced from one another and being of sufficiently larger size than said articles to permit free shifting of the said articles within said enclosures and to permit a non-planar arrangement of adjoining enclosures, whereby articles in one of said layers are nested with respect to the articles in the adjacent layer minimizing the unfilled volume within said container.

2. A frozen pack comprising a generally rigid outer container having therein at least two package strip layers in superposition, each of said package strip layers containing a plurality of seafood articles of irregular size and shape which are individually enclosed in spaced-apart relation along the strip, said package strip layers each comprising flexible, sealable sheet material forming an interconnected series of frangibly sealed enclosures along the strip, said enclosures each containing one of said articles, said enclosures being spaced from one another and being of sufficiently larger size than said articles to permit free shifting of said articles within said enclosures and to permit a non-planar arrangement of adjoining enclosures, whereby articles in one of said layers are nested with respect to the articles in the adjacent layer minimizing the unfilled volume within said container, said frangible sealing of said enclosures permitting ready removal of said articles from the strip.

References Cited in the file of this patent

UNITED STATES PATENTS

| | | |
|---|---|---|
| 2,525,651 | Clunan | Oct. 10, 1950 |
| 2,565,444 | Waters | Aug. 21, 1951 |
| 2,600,216 | Denison | June 10, 1952 |
| 2,737,764 | Lewis | Mar. 13, 1956 |
| 2,776,215 | Thomas | Jan. 1, 1957 |
| 2,808,192 | Raisin | Oct. 1, 1957 |
| 2,862,823 | Gorton | Dec. 2, 1958 |

OTHER REFERENCES

Modern Packaging, April 1954, p. 24.